United States Patent [19]

Limburg et al.

[11] Patent Number: 5,040,363

[45] Date of Patent: Aug. 20, 1991

[54] MODULAR SICKLE KNIFE ASSEMBLY

[75] Inventors: Jerry G. Limburg, Moline; Jerome L. Weber, Aledo, both of Ill.

[73] Assignee: Deere & Company, Moline, Ill.

[21] Appl. No.: 505,315

[22] Filed: Apr. 5, 1990

[51] Int. Cl.$^5$ .............................................. A01D 34/14
[52] U.S. Cl. ......................................... 56/300; 56/302
[58] Field of Search ................. 56/296, 297, 298, 299, 56/300, 301, 302

[56] References Cited

U.S. PATENT DOCUMENTS

| | | |
|---|---|---|
| 235,855 | 12/1880 | Deevy . |
| 329,696 | 11/1885 | Barnes . |
| 489,433 | 1/1893 | Ellsworth ............................ 56/300 |
| 512,770 | 1/1894 | Vermilion ........................... 56/300 |
| 668,486 | 2/1901 | Brown ................................. 56/302 |
| 987,716 | 3/1911 | Griffiths . |
| 1,218,511 | 3/1917 | Berglund ............................. 56/302 |
| 1,233,950 | 7/1917 | Aidlotte . |
| 1,340,868 | 5/1920 | Aidlotte . |
| 4,805,390 | 2/1989 | Majkrzak ............................. 56/300 |
| 4,854,114 | 8/1989 | Speck ................................... 56/296 |

OTHER PUBLICATIONS

Excerpt from John Deere Parts Catalog, 900 Series Cutting Platform, PC-2104, dated Sep. 1987, p. 20-2.

Primary Examiner—William P. Neuder

[57] ABSTRACT

A modular sickle bar having knifeback sections with splice plates can be joined together to form an elongated knifeback. Each of the splice plates are provided with a pair of holes corresponding to holes of adjoining full knife sections. In this way, conventional two-hole full knife sections are used throughout the sickle bar assembly. The sickle bar assembly is also provided with a half knife section that can be readily mounted in the field because its first mounting hole corresponds to the mounting hole of the adjoining full knife section, and the second mounting hole corresponds to the mounting hole for the next full knife section along the knifeback.

8 Claims, 2 Drawing Sheets

MODULAR SICKLE KNIFE ASSEMBLY

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Illinois 61265, U.S.A., together with all rights to file, and to claim priorities in connection with, corresponding patent applications in any and all foreign countries in the name of Deere & Company or otherwise.

BACKGROUND OF THE INVENTION

1. Field of the Invention

The invention is directed to a modular sickle knife assembly using relatively conventional two hole knife sections and specialized half knife sections.

2. Description of the Prior Art

A typical harvesting platform is provided with an elongated sickle knife assembly comprising a continuous elongated knifeback portion and a series of knife sections bolted or rivetted to the knifeback portion. The majority of the knife sections are triangularly shaped having two cutting edges. The knife sections at the farthest ends of the knifeback portion comprise half sections.

It is difficult to ship replacement knifeback portions because they are relatively long units. Sectionalized or modular knifeback portions having splice plates that are held together by specialized or additional fasteners are already known, see U.S. Pat No. 329,696, 4,805,390 and 4,854,114. In addition, U.S. Pat. No. 1,340,868 discloses a sectionalized knifeback having splice plates that are held together by a single rivet that is also used to secure the knife section to the knifeback sections.

SUMMARY

It is an object of the present invention to provide a modular sickle knife assembly having a sectionalized knifeback portions that are joined together by mounting bolts for conventional two-hole knife sections.

It is a feature of the present invention that the splice plates of the knifeback sections are provided with a pair of aligned holes which correspond to the holes for adjoining two-hole knife sections.

It is another object of the present invention to provide a half knife section that can be easily installed in the field.

It is another feature of the present invention that the half knife section is provided with a pair of holes that correspond to the holes for adjoining two-hole knife sections.

The knifeback sections of the present invention are provided with pairs of holes equally spaced along each knifeback section. These pairs of holes correspond to the mounting holes for adjoining knife sections. Each of the knifeback sections are provided with at least one splice plate also having a pair of holes. When the splice plates are joined together, the pairs of holes therethrough are aligned with one another, and mounting bolts for the adjoining knife sections pass through each of the holes.

As the knife sections are sold in standard lengths, a farmer may have to cut the last knifeback section to fit it to a particular platform. The knifeback section can be cut with a hacksaw. New holes would have to be drilled for a conventional half knife section at that end of the knifeback. Power tools may not be available in the field. Therefore it is desirable that the half knife section be attached to existing holes. The half knife section of the present invention is provided with a pair of mounting holes corresponding to a pair of holes already formed in the standardized knifeback section. These holes correspond to the holes for the adjoining knife section and the hole in the knifeback for accommodating the next knife section.

DETAILED DESCRIPTION

Figure 1:
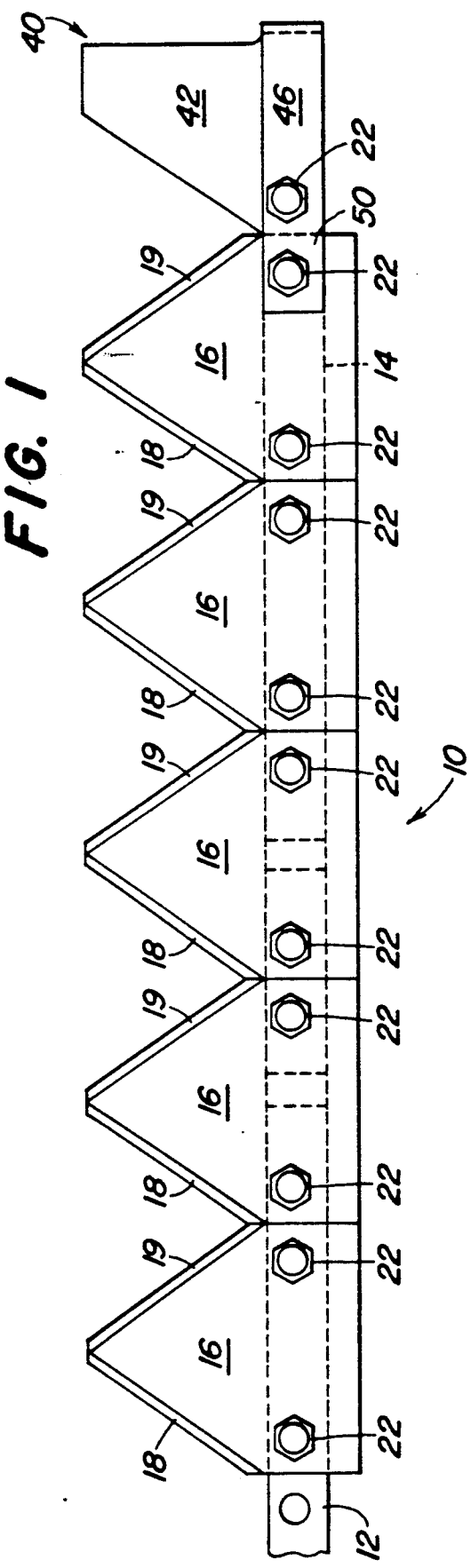
FIG. 1 is a top view of a modular knife assembly.
Figure 2:
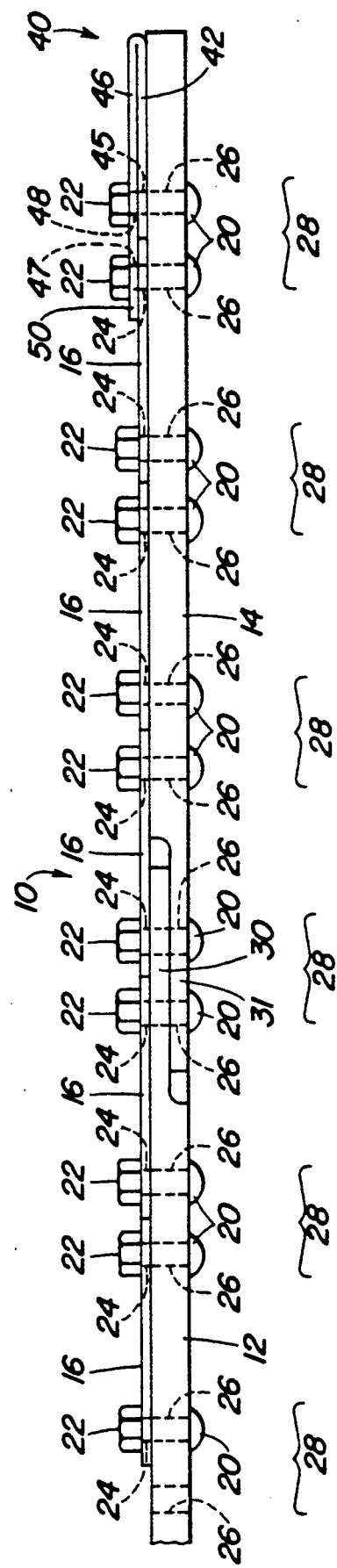
FIG. 2 is a rear view of a modular knife assembly.

FIGS. 1 and 2 disclose an end portion of a sickle knife assembly 10 comprising two knifeback sections 12 and 14 and a series of full knife sections 16. The full knife sections 16 are convention two-hole knife sections having two cutting edges 18 and 19. They are secured to the knifeback section by mounting bolts 20 having nuts 22. Each of the full knife sections 16 are provided with two holes 24 located at opposite ends of the knife section. These holes comprise mounting holes through which the mounting bolts pass. Although the present invention is illustrated as having mounting nuts and bolts, other types of fasteners could be used, such as rivets.

The mounting holes of the knife sections correspond to holes 26 in the knifeback sections. The holes in the knifeback sections are arranged in pairs equally spaced along the knifeback section. These pairs of holes 28 correspond to the mounting holes for adjoining knife sections.

The first knifeback section 12 is provided with a splice plate 30, and the second knifeback section 14 is provided with splice plate 31. Each of the splice plates are provided with a pair of holes 28. The splice plates are held together by mounting bolts passing through the pair of aligned holes in 15 each of the splice plates. As can be seen in FIGS. 1 and 2 no specialized full knife section is necessary to secure the splice plates together.

At the end of the sickle bar assembly is half knife section 40. Half knife section 40 comprises plate 42 having a single mounting hole 45. Strap 46 overlies the plate and is provided with a pair of mounting holes 47 and 48. The strap is also provided with an extending portion 50 which extends past the edge of the plate. The extending portion is provided with mounting hole 47 which corresponds to the mounting hole for the adjoining full knife section. The other mounting hole 48 is axially aligned with the mounting hole 45 located in the plate 42. Holes 45 and 48 are axially aligned with the second hole in the knifeback being provided for the next adjoining knife section.

Figure 3:
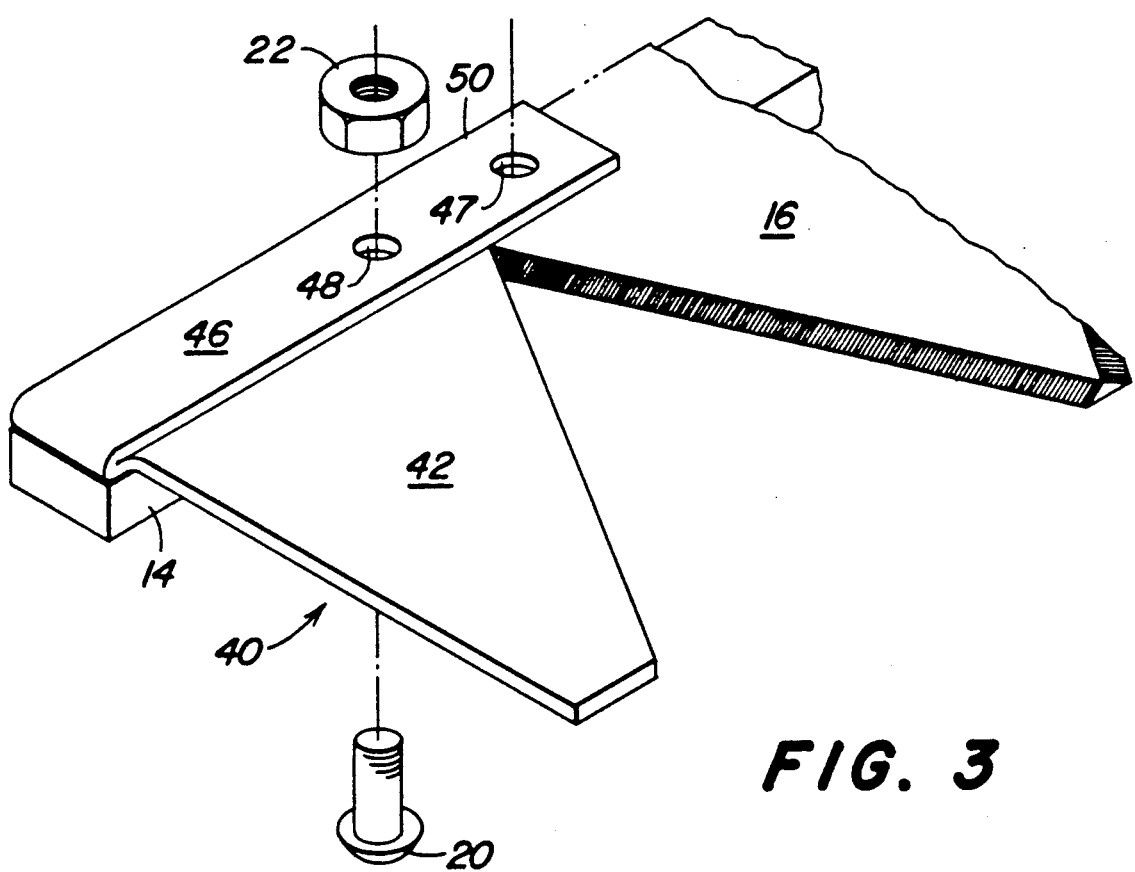
FIG. 3 is a perspective view of the half knife section.

The half knife section can be formed from a single piece of sheet metal by folding over the strap. By locating the mounting holes in the half knife section, as illustrated in FIGS. 1 through 3, the farmer when shortening a knifeback section by cutting off the excess portion does not have to drill an additional hole for the half knife section. As such, the present half knife section is designed to facilitate fixing the knifeback sections in the field.

The present invention should not be limited to the above described embodiments, but should be limited solely by the claims that follow.

We claim:

1. A sickle knife assembly comprising:

first and second elongated knifeback sections that are adapted to be joined together to form the sickle knife assembly, each of the knifeback section having a plurality of holes spaced along the length of the knifeback section, the holes are arranged in pairs, each knifeback section is provided with at least three pairs of holes, each pair being equally spaced along the knifeback section, the first knifeback section is provided with at least one splice plate which overlaps an adjoining splice plate on the second knifeback section for joining the first and second knifeback sections together, each splice plate is provided with one of the pair of holes, the pair of holes in the splice plates are aligned with one another when the splice plates are joined together; and a plurality of full knife sections each being provided with two mounting holes, the first mounting hole being located at one end of the full knife section and the second mounting hole being located at the other end of the full knife section, at least three full knife sections are mounted side-by-side to each of the knifeback sections by fasteners passing through the holes in the knifeback sections and the full knife sections, the first mounting hole in a full knife section and the second mounting hole of an adjoining knife section are each aligned with one of the pair of holes in the splice plates, whereby the two adjoining full knife sections mounted to the splice plates are conventional full knife sections each having only two mounting holes.

2. A sickle knife assembly as defined by claim 1 further comprising what a half knife section which is provided with two mounting holes that are aligned with one of the pair of holes in the knifeback sections.

3. A sickle knife assembly as defined by claim 2 wherein the half knife section is provided with an extending portion through which one of the mounting holes is located.

4. A sickle knife assembly as defined by claim 2 wherein the half knife section is provided with an overlying strap forming an extending portion, one of the mounting holes is located in the extending portion of the strap.

5. A sickle knife assembly as defined by claim 4 wherein the half knife section is provided with a plate having one mounting hole, the strap overlying plate has a pair of mounting holes, one of the mounting holes in the strap is aligned with the mounting hole in the plate.

6. A sickle knife assembly as defined by claim 5 wherein the strap and the plate are formed from a single piece of sheet metal by folding the strap over the plate.

7. A half knife section for a sickle knife assembly, the half knife section comprising:

a plate having one mounting hole; and a strap overlying the plate having two mounting holes, one of the mounting holes in the strap is aligned with the mounting hole in the plate and the other mounting hole in the strap is located in an extending portion projecting outwardly from the plate.

8. A half knife section as defined by claim 7 wherein the strap and the plate are formed from a single piece of sheet metal by folding the strap over the plate.

* * * * *